(12) United States Patent
Wu et al.

(10) Patent No.: US 10,097,672 B2
(45) Date of Patent: Oct. 9, 2018

(54) METHOD AND APPARATUS FOR GENERATING LINK STATE PROTOCOL DATA PACKET

(71) Applicant: ZTE Corporation, Shenzhen (CN)

(72) Inventors: Qiang Wu, Shenzhen (CN); Guangteng Zhou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 120 days.

(21) Appl. No.: 15/030,067

(22) PCT Filed: Jun. 6, 2014

(86) PCT No.: PCT/CN2014/079413
§ 371 (c)(1),
(2) Date: Apr. 17, 2016

(87) PCT Pub. No.: WO2014/187398
PCT Pub. Date: Nov. 27, 2014

(65) Prior Publication Data
US 2016/0261721 A1 Sep. 8, 2016

(30) Foreign Application Priority Data

Oct. 16, 2013 (CN) .......................... 2013 1 0486284

(51) Int. Cl.
*H04L 29/06* (2006.01)
*H04L 12/64* (2006.01)

(52) U.S. Cl.
CPC .......... *H04L 69/06* (2013.01); *H04L 12/6418* (2013.01); *H04L 69/22* (2013.01)

(58) Field of Classification Search
None
See application file for complete search history.

(56) References Cited

U.S. PATENT DOCUMENTS

2007/0286091 A1* 12/2007 Hopps ..................... H04L 45/02
370/252
2008/0159150 A1* 7/2008 Ansari .................... H04L 45/00
370/238

(Continued)

FOREIGN PATENT DOCUMENTS

CN 101350789 A 1/2009
CN 101431471 A 5/2009

(Continued)

OTHER PUBLICATIONS

Doyle, Jeff, OSPF and IS-IS: Choosing an IGP for Large-Scale Networks: Choosing an IGP for Large-Scale Networks, Addison-Wesley Professional, Nov. 1, 2005.*

(Continued)

*Primary Examiner* — Faruk Hamza
*Assistant Examiner* — Cassandra L Decker
(74) *Attorney, Agent, or Firm* — Cantor Colburn LLP (57) ABSTRACT

The disclosure discloses a method and apparatus for generating a Link State Protocol data packet (LSP). In the method, a length of a reserved space is configured, wherein the length of the reserved space is smaller than a default maximum length of a single LSP fragment; and the reserved space is set, according to the length of the reserved space, in all LSP fragments which are generated in sequence. According to the technical solution provided in the disclosure, a bad effect caused by network oscillation can be eliminated significantly.

6 Claims, 4 Drawing Sheets

(56) References Cited

U.S. PATENT DOCUMENTS

| | | | | |
|---|---|---|---|---|
| 2009/0086729 | A1* | 4/2009 | Sarangam | H04L 47/10 370/389 |
| 2010/0003980 | A1 | 1/2010 | Rune | |
| 2010/0074276 | A1* | 3/2010 | Bergstrom | H04L 47/10 370/471 |
| 2012/0140686 | A1* | 6/2012 | Wen | H04W 28/065 370/310 |
| 2012/0196644 | A1 | 8/2012 | Scherzer | |
| 2012/0327954 | A1* | 12/2012 | Iourtchenko | H04L 65/607 370/474 |
| 2013/0021943 | A1 | 1/2013 | Lu et al. | |
| 2015/0281068 | A1* | 10/2015 | Wang | H04L 12/4641 370/392 |

FOREIGN PATENT DOCUMENTS

| | | |
|---|---|---|
| CN | 101699800 A | 4/2010 |
| CN | 103152261 A | 6/2013 |
| EP | 2056633 A2 | 5/2009 |
| WO | 2010148791 A1 | 12/2010 |
| WO | 2013134669 A1 | 9/2013 |

OTHER PUBLICATIONS

International Search Report for corresponding application No. PCT/CN2014/079413 filed Jun. 6, 2014; dated Sep. 3, 2014.
European Search Report for corresponding application EP14853617; dated Oct. 17, 2016.
European Search Report Application No. PCT/CN20140799413; Dated Nov. 4, 2016; pp. 11.
Lu A Tian Ericsson W: "ISIS Transations TLV: Draft-lu-isis-transaction-tlv-000.txt", ISIS Trnation TLV: DRAFT-LU-ISIS-TRANSATION-TLV.00.TXT, Internet Enginerring Task Forsce IETF; Standardworkingdraft, Internet Society (ISOC) 4, Rue Des Falaises CH-1205 Geneva, Switzerland, Mar. 5, 2012, p. 1-12, XP015081093.

* cited by examiner

METHOD AND APPARATUS FOR GENERATING LINK STATE PROTOCOL DATA PACKET

TECHNICAL FIELD

The disclosure relates to the field of communications, and in particular to a method and apparatus for generating a Link State Protocol data packet (LSP).

BACKGROUND

Currently, an Intermediate System to Intermediate System (ISIS) routing protocol adopted in the relevant art is a dynamic, link state-based Interior Gateway Protocol (IGP). After the ISIS routing protocol establishes a neighbour by an interactive negotiation of a HELLO message, each Intermediate System (IS) generates an LSP for describing link state information of the IS, and sends the corresponding LSP to a network. In addition, each IS stores LSPs sent by other ISs on a network topology so as to form a Link State Database (LSDB). The ISIS routing protocol uses the LSDB to compute an optimum route to a destination address via a Shortest Path First (SPF) algorithm.

In an integrated ISIS routing protocol, each LSP mainly includes a great amount of Internet Protocol (IP) reachability information, namely, IP prefix routing information. The IP reachability information mainly comes from two aspects as follows: 1. An IP prefix, configured on a three-layer routing interface self-configured by each IS, is notified in the corresponding LSP as the IP reachability information to represent that the IS may reach an routing network segment of the IP. 2. After each IS has been configured with route leaking or redistribution, an IP prefix in a three-layer routing table is notified in the corresponding LSP to represent that the IS may reach an IP routing network segment via a route in other layer of the IS or other routing protocols, wherein the three-layer routing table is self-generated by the ISIS routing protocol, or is generated by a routing protocol which is configured and correspondingly redistributed.

Each IS needs to notify link state information which may be divided into multiple types and is filled in the corresponding LSP in a Type Length Value (TLV) form. The corresponding LSP notified by each IS has a plurality of fragments, 256 at most. Each fragment corresponds to a number (0-255). Each fragment has a maximum length, defaulting to 1492 bytes. Under normal conditions, an LSP generated by an IS starts to be generated from an LSP of which a fragment is numbered as 0, when the LSP of which the fragment is numbered as 0 is filled to a maximum length, if there is still link state information which needs to be filled in the LSP to be notified, i.e., a fragment numbered as 1 is generated, and operations are carried out in the same manner until all pieces of link state information required to be notified are notified in the LSP. Consequently, the length of only the last LSP fragment among the LSP fragments may not reach the maximum length due to the completion of the link state information required to be notified, and the lengths of the other LSP fragments may reach the maximum length (1492).

Thus, in a large-scale network, a huge number of LSDBs are required to be notified. Particularly, a great amount of IP reachability information is required to be notified in the network usually, and therefore the IP reachability information occupies a majority of LSP fragments to be notified usually. When the occupied LSP length varies due to additions, deletions and changes (including: a metric change, a type change and an attribute change) of the IP reachability information required to be notified in the LSP, LSP regeneration of an LSP fragment and subsequent fragments is caused, thereby causing layout reorganisation of these LSPs. However, the layout reorganisation brings negative effects, namely, when a remote IS computes the IP reachability information notified by a current IS, certain pieces of IP reachability information have moved from a fragment to another fragment, and when these LSPs flood in the network, the remote IS firstly receives an LSP of which the IP reachability information is moved away, thereby deleting an IP route. When another LSP fragment is received after a period of time, the IP route may be recovered by re-notifying the IP reachability information in the LSP fragment, thereby causing route missing within this period of time, and traffic reaching the IP prefix is forced to be interrupted.

With the gradual enlargement of a network scale, the link state information required to be notified by each IS may be increased to a great extent accordingly, and therefore the LSPs required to be generated are increased day by day. However, oscillation, frequent increasing, deletions and changes (including: the metric change, the type change and the attribute change) of certain pieces of link state information (for example, IP reachability information) are caused due to certain reasons (for example, certain links are frequently up and down due to physical faults, routing of a redistribution protocol greatly oscillates, and the system-id of the ISIS protocol is repeatedly configured), and therefore many LSPs are continuously reorganised and updated. Thus, Central Processing Unit (CPU) resources of a local IS are greatly consumed. In addition, the efficiency of generating the LSPs by the ISs is reduced to a great extent accordingly. Before certain LSPs have time to respond to the previous change, a new turn of reorganisation and update starts, thereby increasing flooding loads of the LSPs on the network, and causing frequent oscillation of all IS routes in the network topology.

SUMMARY

The disclosure provides a method and apparatus for generating an LSP, which are intended to at least solve the problems of increasing of flooding loads of LSPs on a network and causing frequent oscillation of all IS routes in a network topology due to frequent reorganisation and update of a great number of LSPs during the generation of the LSPs.

According to one aspect of the disclosure, a method for generating an LSP is provided.

The method for generating an LSP according to the disclosure may include that: a length of a reserved space is configured, wherein the length of the reserved space is smaller than a default maximum length of a single LSP fragment; and the reserved space is set, according to the length of the reserved space, in all LSP fragments which are generated in sequence.

In an example embodiment, after the reserved space is set, according to the length of the reserved space, in all the LSP fragments which are generated in sequence, the method may further include that: according to a type of a link state information item (ITEM) to be inserted and/or a key word of the ITEM to be inserted, a serial number of an LSP fragment corresponding to the ITEM to be inserted and information of a position in which the ITEM is to be inserted in the LSP fragment are searched; when a length of a residual space in the found LSP fragment is determined to be greater than or equal to a length of the ITEM to be inserted, the ITEM to be inserted is directly inserted into the found LSP fragment according to the serial number of the LSP fragment and the information of the position in which the ITEM is to be inserted; and link state information in the found LSP fragment is reorganised and updated.

In an example embodiment, after the reserved space is set, according to the length of the reserved space, in all the LSP fragments which are generated in sequence, the method may further include that: when the length of the residual space in the found LSP fragment is determined to be smaller than the length of the ITEM to be inserted, and at least one LSP fragment which is not used exists in a currently used IS, link state information in each LSP fragment is reorganised and updated in sequence, starting from the LSP fragment corresponding to serial number.

In an example embodiment, after the reserved space is set, according to the length of the reserved space, in all the LSP fragments which are generated in sequence, the method may further include that: when the length of the residual space in the found LSP fragment is determined to be smaller than the length of the ITEM to be inserted, and all LSP fragments in the IS are already used, the length of the reserved space is readjusted.

In an example embodiment, after the reserved space is set, according to the length of the reserved space, in all the LSP fragments which are generated in sequence, the method may further include that: an LSP fragment where an ITEM to be deleted is located is searched; it is judged whether at least one other ITEM, except the ITEM to be deleted, exists in the found LSP fragment; when the at least one other ITEM, except the ITEM to be deleted, exists in the found LSP fragment, link state information in the found LSP fragment is reorganised and updated; and when no other ITEM, except the ITEM to be deleted, exists in the found LSP fragment, the length of the reserved space is readjusted.

In an example embodiment, the length of the reserved space is readjusted according to a following formula:

$$L_r = \left(\sum_{n=0}^{256} (L_{max} - L_n^{cur})/256\right) * N \%,$$

where, $L_r$ is the length of the reserved space, $L_{max}$ is the default maximum length, $L_n^{cur}$ represents a current actual length of an LSP fragment numbered as n, $0 \leq n \leq 256$, $0 < N < 100$.

According to another example of the disclosure, an apparatus for generating an LSP is provided.

The apparatus for generating an LSP according to the disclosure may include: a configuration component, configured to configure a length of a reserved space, wherein the length of the reserved space is smaller than a default maximum length of a single LSP fragment; and a setting component, configured to set, according to the length of the reserved space, the reserved space in all LSP fragments which are generated in sequence.

In an example embodiment, the apparatus may further include: a first searching component, configured to search, according to a type of a ITEM to be inserted and/or a key word of the ITEM to be inserted, for a serial number of an LSP fragment corresponding to the ITEM to be inserted, and information of a position in which the ITEM is to be inserted in the LSP fragment; an insertion component, configured to, when a length of a residual space in the found LSP fragment is determined to be greater than or equal to a length of the ITEM to be inserted, directly insert the ITEM to be inserted into the found LSP fragment according to the serial number of the LSP fragment and the information of the position in which the ITEM is to be inserted; and a first reorganisation and update component, configured to reorganise and update link state information in the found LSP fragment.

In an example embodiment, the apparatus may further include: a second reorganisation and update component, configured to, when the length of the residual space in the found LSP fragment is determined to be smaller than the ITEM to be inserted, and at least one LSP fragment which is not used exists in a currently used IS, reorganise and update link state information in each LSP fragment in sequence, starting from the LSP fragment corresponding to the serial number.

In an example embodiment, the apparatus may further include: a first adjustment component, configured to readjust the length of the reserved space when the length of the residual space in the found LSP fragment is determined to be smaller than the length of the ITEM to be inserted, and all LSP fragments in the IS are already used.

In an example embodiment, the apparatus may further include: a second searching component, configured to search for an LSP fragment where an ITEM to be deleted is located; a judgment component, configured to judge whether at least one other ITEM, except the ITEM to be deleted, exists in the found LSP fragment; a third reorganisation and update component, configured to reorganise and update link state information in the found LSP fragment when the judgment component judges that the at least one other ITEM, except the ITEM to be deleted, exists in the found LSP fragment; and a second adjustment component, configured to readjust the length of the reserved space when the judgment component judges that no other ITEM, except the ITEM to be deleted, exists in the found LSP fragment.

By means of the embodiments of the disclosure, the length of the reserved space is configured, wherein the length of the reserved space is smaller than the default maximum length of the single LSP fragment; and the reserved space is set, according to the length of the reserved space, in all the LSP fragments which are generated in sequence, namely the reserved space is respectively set in all the LSP fragments which are generated in sequence. The relevant art in which, after a current LSP fragment is filled with the link state information, a subsequent LSP fragment next to the current LSP fragment is continuously generated and the link state information is continuously filled is no longer adopted. A space out of the reserved space in each LSP fragment is filled with the link state information instead. Thus, the problems of increasing of the flooding loads of the LSPs on the network and causing frequent oscillation of all IS routes in the network topology due to frequent reorganisation and update of a great number of LSPs during the generation of the LSPs are solved, thus a bad effect caused by network oscillation can be eliminated significantly.

BRIEF DESCRIPTION OF THE DRAWINGS

The drawings described herein are intended to provide further understanding of the disclosure, and form a part of the disclosure. The schematic embodiments and descriptions of the disclosure are intended to explain the disclosure, and do not form improper limits to the disclosure. In the drawings.

DETAILED DESCRIPTION

The disclosure is described below with reference to the drawings and the embodiments in detail. It is noted that the embodiments of the disclosure and the features of the embodiments can be combined with each other if there is no conflict.

Figure 1:
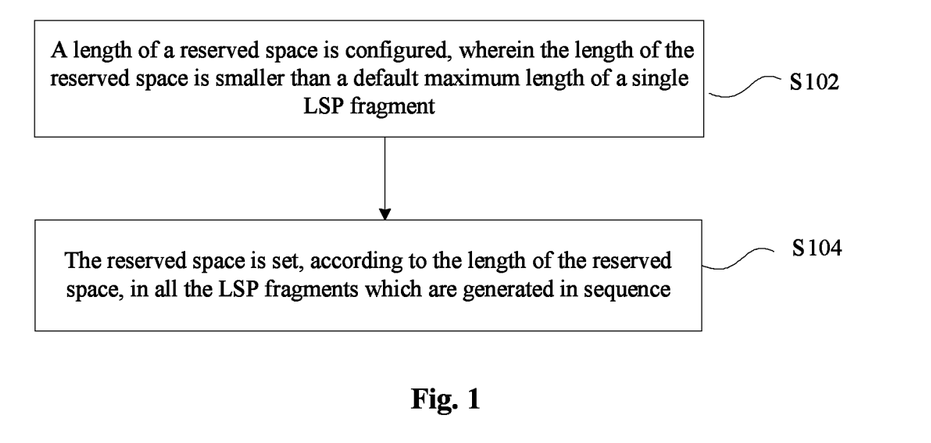
FIG. 1 is a flowchart of a method for generating an LSP according to an embodiment of the disclosure.

FIG. 1 is a flowchart of a method for generating an LSP according to an embodiment of the disclosure. As shown in FIG. 1, the method may include the steps as follows.

Step S102: A length of a reserved space is configured, wherein the length of the reserved space is smaller than a default maximum length of a single LSP fragment.

Step S104: The reserved space is set, according to the length of the reserved space, in all the LSP fragments which are generated in sequence.

In the relevant art, flooding loads of the LSPs on a network are increased, and frequent oscillation of all IS routes in a network topology is triggered due to frequent reorganisation and update of a great number of LSPs during the generation of the LSPs. By means of the method shown in FIG. 1, the length of the reserved space is configured, wherein the length of the reserved space is smaller than the default maximum length of the single LSP fragment; and the reserved space is set, according to the length of the reserved space, in all the LSP fragments which are generated in sequence, namely the reserved space is set in all the LSP fragments which are generated in sequence respectively. The relevant art in which, after a current LSP fragment is filled with the link state information, a subsequent LSP fragment next to the current LSP fragment is continuously generated and the link state information is continuously filled in is no longer adopted. A space out of the reserved space in each LSP fragment is filled with the link state information instead. Thus, the problems of increasing of the flooding loads of the LSPs on the network and causing frequent oscillation of all IS routes in the network topology due to frequent reorganisation and update of a great number of LSPs during the generation of the LSPs are solved, thus a bad effect caused by network oscillation can be eliminated significantly.

In an example embodiment, after the reserved space is set, according to the length of the reserved space, in all the LSP fragments which are generated in sequence in Step S104, the method may further include the steps as follow:

Step S1: According to a type of a ITEM to be inserted and/or a key word of the ITEM to be inserted, a serial number of an LSP fragment corresponding to the ITEM to be inserted, and information of a position in which the ITEM is to be inserted in the LSP fragment are searched.

Step S2: When a length of a residual space in the found LSP fragment is determined to be greater than or equal to a length of the ITEM to be inserted, the ITEM to be inserted is directly inserted into the found LSP fragment according to the serial number of the LSP fragment and the information of the position in which the ITEM is to be inserted.

Step S3: Link state information in the found LSP fragment is reorganised and updated.

In an example embodiment, a rule of filling the LSP with the link state information may be adopted as follows. Different types of link state information are sorted according to classes. For example, neighbour link state information is filled in the LSP in preference to IP reachability information. The link state information in the same class may be arranged by size from small to large according to the key word corresponding to the ITEM, and the link state information corresponding to a small key word is filled in an LSP message preferentially. For example, according to a prefix and a mask, the IP reachability information is arranged by size from small to large and filled in the LSP fragments.

In an ISIS routing protocol, only the maximum length of the LSP generated may be limited. Due to the complexity and diversity of different types of link state information which is actually filled in the LSP, it cannot be required that an LSP with a new fragment can be used only after the length of the LSP fragment must be filled to the maximum length. Consequently, aiming at the situation of insertion of link state data information, insertion of a new ITEM into a TLV of a link state type causes the reorganisation and update for LSP fragments within a subsequent serial number of the LSP fragment within a serial number inserted, but the reorganisation and update may be inhibited within a certain range. Thus, a space with a pre-set length may be reserved for each LSP fragment. When the new ITEM is inserted into the TLV of the link state type, the LSP fragment to be inserted and the information of the position to be inserted may be searched in order according to the rule of filling the LSP with the link state information, and the ITEM is directly inserted into a current LSP fragment. Because the fragment also has a reserved space capable of accommodating the newly inserted ITEM, any other LSP fragments cannot be reorganised and updated, the numbered LSP fragment to which the ITEM is inserted is only required to be updated.

In an example embodiment, after the reserved space is set, according to the length of the reserved space, in all the LSP fragments which are generated in sequence in Step S104, the method may further include the operations as follows.

Step S4: When the length of the residual space in the found LSP fragment is determined to be smaller than the length of the ITEM to be inserted, and at least one LSP fragment which is not used exists in a currently used IS, the link state information in each LSP fragment is reorganised and updated in sequence, starting from the LSP fragment corresponding to the serial number.

In an example embodiment, when the LSP fragment to be inserted cannot accommodate a newly added ITEM and at least one LSP fragment which is not used exists in the currently used IS, namely a maximum serial number of the LSP fragment among the LSP fragments which are currently and completely generated does not reach a maximum allowed serial number 255, the subsequently numbered LSP fragments can be reorganised and updated starting from the currently numbered LSP fragment.

In an example embodiment, after the reserved space is set, according to the length of the reserved space, in all the LSP fragments which are generated in sequence in Step S104, the method may further include the steps as follows.

Step S5: When the length of the residual space in the found LSP fragment is determined to be smaller than the length of the ITEM to be inserted, and all LSP fragments in the IS are already used, the length of the reserved space is readjusted.

In an example embodiment, when the current IS has used all the LSP fragments, namely the maximum serial number of the LSP fragment among the LSP fragments which are currently and completely generated reaches the maximum allowed serial number 255, the reserved space of each LSP is required to be re-set at this moment.

In an example embodiment, after the reserved space is set, according to the length of the reserved space, in all the LSP fragments which are generated in sequence in Step S104, the method may further include the operations as follows.

Step S6: An LSP fragment where an ITEM to be deleted is located is searched.

Step S7: It is judged whether at least one other ITEM, except the ITEM to be deleted, exists in the found LSP fragment.

Step S8: When the at least one other ITEM, except the ITEM to be deleted, exists in the found LSP fragment, the link state information in the found LSP fragment is reorganised and updated.

Step S9: When no other ITEM, except the ITEM to be deleted, exists in the found LSP fragment, the length of the reserved space is readjusted.

In an example embodiment, aiming at the situation of deletion of the ITEM from the LSP, the ITEM may be deleted in a numbered LSP fragment, and when at least one other ITEM still exists in the LSP, only the numbered LSP fragment is updated, and it is unnecessary to reorganise and update any other numbered LSP fragments. When all ITEMs in the LSP are emptied, the reserved space in each LSP is required to be re-set.

In an example implementation process, the length of the reserved space may be readjusted according to a following formula:

$$L_r = \left(\sum_{n=0}^{256} (L_{max} - L_n^{cur})/256\right) * N \%,$$

where, $L_r$ is the length of the reserved space, $L_{max}$ is the default maximum length, $L_n^{cur}$ represents a current actual length of an LSP fragment numbered as n, $0 \leq n \leq 256$, $0 < N < 100$.

In an example embodiment, aiming at the situation of difference between the lengths of the residual spaces in all the LSP fragments, equilibrium assignment is performed on the residual space in each LSP fragment, namely the residual spaces are re-set. The reserved space of the LSP is set as 75 percent of an average residual available space (namely the value of N is 75 percent). If the corrected reserved space of the LSP is smaller than 25 bytes, namely the reserved space of the LSP is set as 0; the space of the LSP is saturated at this moment. In this ultimate state, the IS would lose a function of inhibiting oscillation by generating the reserved space of the LSP when new link state information is added. If the corrected reserved space of the LSP is greater than or equal to an initial reserved space of the LSP, namely the reserved space of the LSP is set as the initial reserved space of the LSP, at this moment, the IS maximizes a performance for inhibiting oscillation by generating the reserved space of the LSP when the new link state information is added.

The example implementation process is further described below with reference to an example implementation mode shown in FIG. 2.

Figure 2:
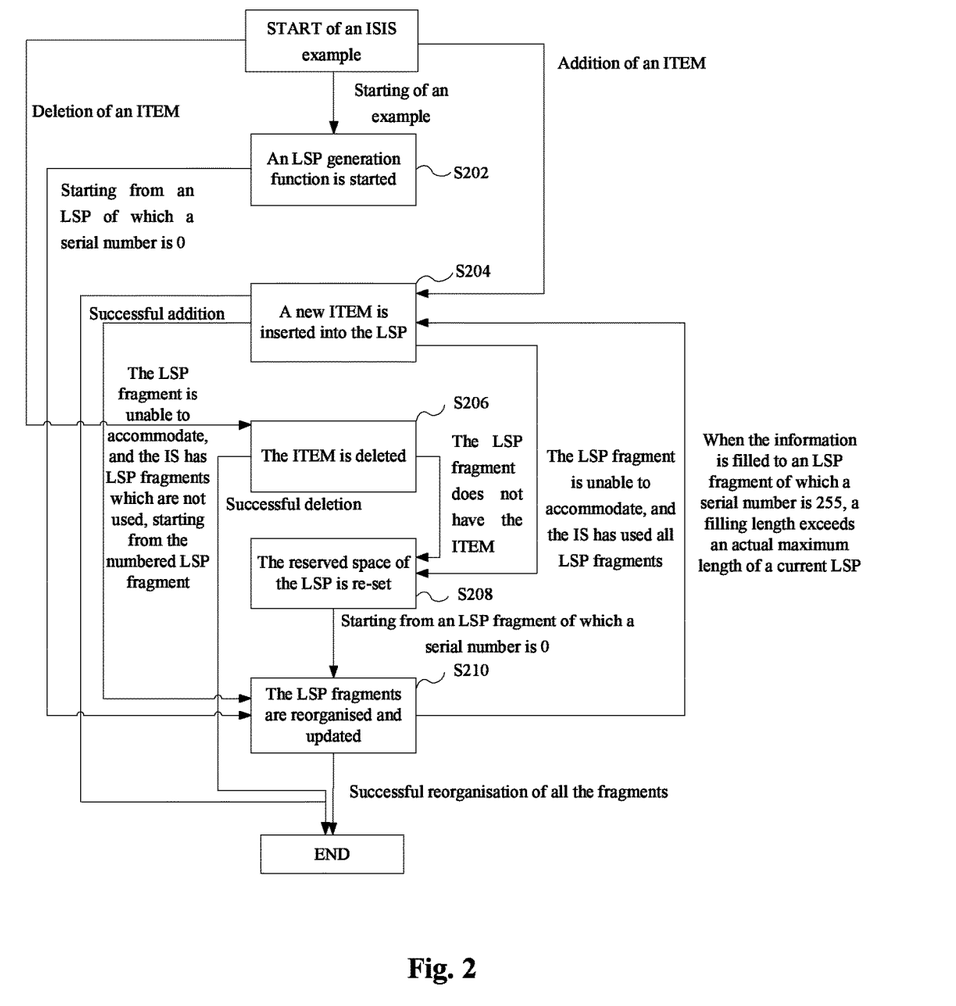
FIG. 2 is a flowchart of a method for inhibiting oscillation of generation of an LSP of an ISIS protocol according to an example embodiment of the disclosure.

FIG. 2 is a flowchart of a method for inhibiting oscillation of generation of an LSP of an ISIS protocol according to an example embodiment of the disclosure. As shown in FIG. 2, the flow may include the processing steps as follows.

Step S202: An LSP generation function is started. Under an initial state, an ISIS protocol begins to be started. In the example embodiment, a reserved space of an LSP may be set as 25 percent of a maximum length of the LSP; and a default maximum length of the LSP is 1492, so an initial reserved space of the LSP is 373 obtained by multiplying 1492 by 25%, and an actual maximum length of the LSP is obtained by subtracting the initial reserved space of the LSP from the default maximum length of the LSP. Under a default condition, the actual maximum length of the LSP is 1119 obtained by multiplying 1492 by 75%. Step S210 is executed, and all LSP fragments start to be reorganised and updated from an LSP fragment of which a serial number is 0; after the ISIS protocol runs, if an ITEM is newly added to the LSP, Step S204 is executed; and after the ISIS protocol runs, if an ITEM is required to be deleted from the LSP, Step S206 is executed.

Step S204: A new ITEM is inserted into the LSP. According to a rule of filling the LSP with link state information, an ITEM (for example, IP reachability information) is inserted. According to ordering of the rule of filling the LSP with the link state information, the ITEM is located to an LSP fragment which should be inserted, and the position of the LSP fragment.

If the LSP fragment to be inserted may accommodate the newly added ITEM, including that: under two conditions that the LSP is not filled to the actual maximum length, or the LSP is already filled to reach or exceed the actual maximum length and the reserved space of the LSP exists, the ITEM may be directly inserted and the LSP fragment is reorganised and updated. Further, it is unnecessary to reorganise and update any other LSP fragments.

If the LSP fragment to be inserted may not accommodate the newly added ITEM and at least one LSP fragment which is not used exists in a current IS, namely a maximum serial number of the LSP fragment among LSP fragments which are currently and completely generated does not reach a maximum allowed serial number 255, the subsequently numbered LSP fragments can be reorganised and updated starting from the currently numbered LSP fragment, and Step S210 is executed.

If the current IS already uses all the LSP fragments, namely the maximum serial number of the LSP fragment among the LSP fragments which are currently and completely generated reaches the maximum allowed serial number 255, Step S208 is executed.

Step S206: An ITEM which already exists is deleted from the LSP. Namely, the ITEM is deleted from a numbered LSP fragment.

If at least one other ITEM still exists in the LSP fragment after the ITEM is deleted, the numbered LSP fragment is only updated, and any other numbered LSP fragments may not be reorganised and updated.

If no other ITEM exists in the LSP fragment after the ITEM is deleted, Step S208 is continuously executed.

Step S208: The reserved space of the LSP is re-set, namely the reserved space of the LSP is re-set by adopting a following formula:

$$L_r = \left(\sum_{n=0}^{256} (L_{max} - L_n^{cur})/256\right) * 75\%,$$

where, $L_r$ is the length of the reserved space, $L_{max}$ is the default maximum length, $L_n^{cur}$ represents a current actual LSP length of an LSP fragment numbered as n.

The reserved space of the LSP is set as 75 percent of an average residual available space. If the corrected reserved space of the LSP is smaller than 25 bytes, namely the reserved space of the LSP is set as 0, the space of the LSP is saturated at this moment. In this ultimate state, the IS would lose a function of inhibiting oscillation by generating the reserved space of the LSP when new link state information is added. If the corrected reserved space of the LSP is greater than or equal to an initial reserved space of the LSP (the initial reserved space of the LSP is 373 obtained by multiplying 1492 by 25%), namely the reserved space of the LSP is set as the initial reserved space of the LSP, at this moment, the IS maximizes a performance for inhibiting oscillation by generating the reserved space of the LSP when the new link state information is added. Step S210 is continuously executed, all LSP fragments start to be reorganised and updated from an LSP fragment of which a serial number is 0.

Step S210: The LSP fragments are reorganised and updated. The LSP fragments start to be reorganised and updated from the fragments required to be numbered, the link state data information is filled into the LSP in sequence according to the rule of filling the LSP with the link state information. And after a numbered fragment is filled to an actual LSP total length, a next fragment is applied, the link state data information is continuously filled after the number is gradually added with 1 until an LSDB required to be notified is completely filled. When the information is filled to an LSP fragment of which a serial number is 255, a filling length exceeds an actual maximum length of a current LSP, and when new link state data information is still required to be inserted, for these ITEMs which are also required to be inserted, Step S208 is executed.

Figure 3:
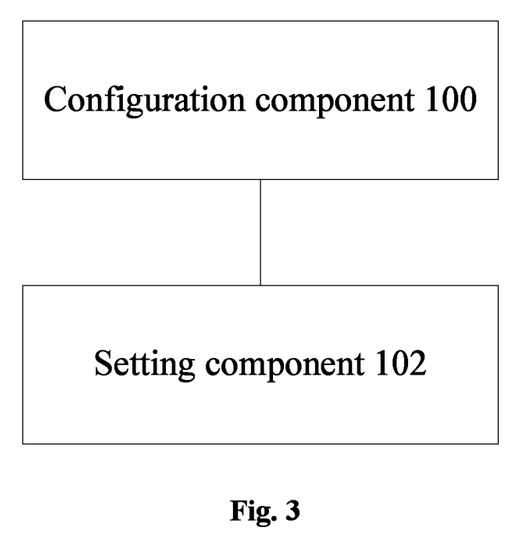
FIG. 3 is a structure block diagram of an apparatus for generating an LSP according to an embodiment of the disclosure.

FIG. 3 is a structure block diagram of an apparatus for generating an LSP according to an embodiment of the disclosure. As shown in FIG. 3, the apparatus for generating an LSP may include: a configuration component 100, configured to configure a length of a reserved space, wherein the length of the reserved space is smaller than a default maximum length of a single LSP fragment; and a setting component 102, configured to set, according to the length of the reserved space, the reserved space in all LSP fragments which are generated in sequence.

By means of the apparatus shown in FIG. 3, the problems in the relevant art of increasing of the flooding loads of the LSPs on the network and causing frequent oscillation of all IS routes in the network topology due to frequent reorganisation and update of a great number of LSPs during the generation of the LSPs are solved, thus a bad effect caused by network oscillation can be further eliminated significantly.

Figure 4:
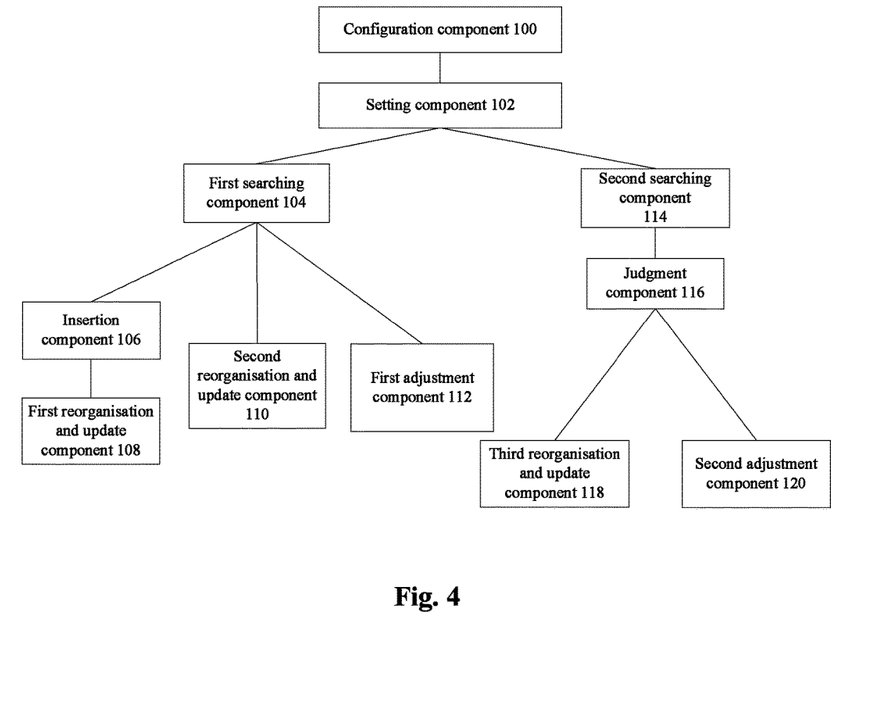
FIG. 4 is a structure block diagram of an apparatus for generating an LSP according to an example embodiment of the disclosure.

In an example embodiment, as shown in FIG. 4, the apparatus may further include: a first searching component 104, configured to search, according to a type of an ITEM to be inserted and/or a key word of the ITEM to be inserted, for a serial number of an LSP fragment corresponding to the ITEM to be inserted, and information of a position in which the ITEM is to be inserted in the LSP fragment; an insertion component 106, configured to, when a length of a residual space in the found LSP fragment is determined to be greater than or equal to a length of the ITEM to be inserted, directly insert the ITEM to be inserted into the found LSP fragment according to the serial number of the LSP fragment and the information of the position in which the ITEM is to be inserted; and a first reorganisation and update component 108, configured to reorganise and update link state information in the found LSP fragment.

In an example embodiment, as shown in FIG. 4, the apparatus may further include: a second reorganisation and update component 110, configured to, when the length of the residual space in the found LSP fragment is determined to be smaller than the ITEM to be inserted, and at least one LSP fragment which is not used exists in a currently used IS, reorganise and update link state information in each LSP fragment in sequence, starting from the LSP fragment corresponding to the serial number.

In an example embodiment, as shown in FIG. 4, the apparatus may further include: a first adjustment component 112, configured to readjust the length of the reserved space when the length of the residual space in the found LSP fragment is determined to be smaller than the length of the ITEM to be inserted, and all LSP fragments in the IS are already used.

In an example embodiment, as shown in FIG. 4, the apparatus may further include: a second searching component 114, configured to search for an LSP fragment where an ITEM to be deleted is located; a judgment component 116, configured to judge whether at least one other ITEM, except the ITEM to be deleted, exists in the found LSP fragment; a third reorganisation and update component 118, configured to reorganise and update link state information in the found LSP fragment when the judgment component judges that the at least one other ITEM, except the ITEM to be deleted, exists in the found LSP fragment; and a second adjustment component 120, configured to readjust the length of the reserved space when the judgment component judges that no other ITEM, except the ITEM to be deleted, exists in the found LSP fragment.

From the above descriptions, it can be seen that the embodiments achieve the following technical effects (it is noted that these effects are achievable by certain example embodiments): the technical solution provided in the disclosure is applicable to various ISIS-supporting devices, including: a router and a switch. ITEMs are added and/or deleted to/from the LSP fragments by the ISIS protocol, so the reorganisation and update range of the LSP fragments is effectively inhibited, and a great number of LSP fragments cannot be reorganised and updated. In addition, only an LSP fragment which is directly affected can be updated under most of the conditions, thus when the ITEMs are frequently added and/or deleted, the condition of reorganisation and update of a great number of LSP fragments is greatly inhibited. In view of a specific condition of generation of an LSP message, an ability to inhibit oscillation for generation of the LSP is dynamically adjusted along with the quantity of the ITEMs, and the oscillation inhibition performance is played to the greatest extent. Meanwhile, under the condition that the ITEMs are fewer, the quantity of the generated LSP messages is reduced to the greatest extent. The technical solution provided in the embodiments of the disclosure effectively controls the reorganisation and update range of the LSP fragments. Thus, resources for the reorganisation and update of the LSP fragments processed by the ISIS are greatly saved, the processing efficiency is improved, and CPU resources are saved. Due to the fact that the technical solution provided in the embodiments of the disclosure effectively controls the reorganisation and update range of the LSP fragments, the quantity of the updated LSPs sent by the ISIS protocol and the flooding loads of the LSPs on the network are reduced. By using the LSP data messages generated according to the technical solution provided in the embodiments of the disclosure, the ITEMs can be filled according to a filling rule of ordered arrangement based on type priority and same-type key words, thereby greatly reducing the receiving computation processing stress of the LSPs, and improving the receiving computation efficiency of the LSPs. Meanwhile, oscillation of computation for topological information, routing information and the like caused by transfer of LSP data information in different LSP fragments is also greatly reduced.

Obviously, those skilled in the art should understand that all components or all steps in the embodiments of the disclosure can be realized by using a generic computation apparatus, can be centralized on a single computation apparatus or can be distributed on a network composed of a plurality of computation apparatuses. Optionally, they can be realized by using executable program codes of the computation apparatuses. Thus, they can be stored in a storage apparatus and executed by the computation apparatuses, the shown or described steps can be executed in a sequence different from this sequence under certain conditions, or they are manufactured into each integrated circuit component respectively, or a plurality of components or steps therein are manufactured into a single integrated circuit component. Thus, the disclosure is not limited to a combination of any specific hardware and software.

The above is only the example embodiments of the disclosure, and is not intended to limit the disclosure. There can be various modifications and variations in the disclosure for those skilled in the art. Any modifications, equivalent replacements, improvements and the like within the principle of the disclosure shall fall within the protection scope of the disclosure.

INDUSTRIAL APPLICABILITY

As above, the method and apparatus for generating an LSP provided by the embodiments of the disclosure have the beneficial effects as follows. The ITEMs are added and/or deleted to/from the LSP fragments by the ISIS protocol, so the reorganisation and update range of the LSP fragments is effectively inhibited, and a great number of LSP fragments cannot be reorganised and updated. In addition, only an LSP fragment which is directly affected can be updated under most of the conditions, thus when the ITEMs are frequently added and/or deleted, the condition of reorganisation and update of a great number of LSP fragments is greatly inhibited. In view of a specific condition of generation of an LSP message, an ability to inhibit oscillation for generation of the LSP is dynamically adjusted along with the quantity of the ITEMs, and the oscillation inhibition performance is played to the greatest extent. Meanwhile, under the condition that the ITEMs are fewer, the quantity of the generated LSP messages is reduced to the greatest extent. The technical solution provided in the embodiments of the disclosure effectively controls the reorganisation and update range of the LSP fragments. Thus, resources for the reorganisation and update of the LSP fragments processed by the ISIS are greatly saved, the processing efficiency is improved, and CPU resources are saved. Due to the fact that the technical solution provided in the embodiments of the disclosure effectively controls the reorganisation and update range of the LSP fragments, the quantity of the updated LSPs sent by the ISIS protocol and the flooding loads of the LSPs on the network are reduced. By using the LSP data messages generated according to the technical solution provided in the embodiments of the disclosure, the ITEMs can be filled according to a filling rule of ordered arrangement based on type priority and same-type key words, thereby greatly reducing the receiving computation processing stress of the LSPs, and improving the receiving computation efficiency of the LSPs. Meanwhile, oscillation of computation for topological information, routing information and the like caused by transfer of LSP data information in different LSP fragments is also greatly reduced.

What is claimed is:

1. A method for generating a Link State Protocol data packet (LSP), comprising:
    configuring a length of a reserved space, wherein the length of the reserved space is smaller than a default maximum length of a single LSP fragment; and
    setting, according to the length of the reserved space, the reserved space in all LSP fragments which are generated in sequence;
    wherein a space out of the reserved space in each LSP fragment of the all LSP fragments is filled with link state information;
    where after setting, according to the length of the reserved space, the reserved space in all the LSP fragments which are generated in sequence, further comprising: readjusting the length of the reserved space when the length of the residual space in the LSP fragment is determined to be smaller than the length of the ITEM to be inserted, and all LSP fragments in the currently used IS are already used; or,
    after setting, according to the length of the reserved space, the reserved space in all the LSP fragments which are generated in sequence, further comprising: searching for an LSP fragment where an ITEM to be deleted is located; judging whether at least one other ITEM, except the ITEM to be deleted, exists in the LSP fragment when the at least one other ITEM, except the ITEM to be deleted, exists in the LSP fragment, reorganising and updating the link state information in the LSP fragment and when no other ITEM, except the ITEM to be deleted, exists in the LSP fragment, readjusting the length of the reserved space;
    wherein the length of the reserved space is readjusted according to a following formula:

$$L_r = \left(\sum_{n=0}^{256} (L_{max} - L_n^{cur})/256\right) * N \ \%,$$

where $L_r$ is the length of the reserved space, $L_{max}$ is the default maximum length, $L_n^{cur}$ represents a current actual length of an LSP fragment numbered as n, $0 \le n \le 256$, $0 < N < 100$.

2. The method as claimed in claim 1, after setting, according to the length of the reserved space, the reserved space in all the LSP fragments which are generated in sequence, further comprising:
    searching, according to a type of a link state information item (ITEM) to be inserted and/or a key word of the ITEM to be inserted, for a serial number of an LSP fragment corresponding to the ITEM to be inserted, and information of a position in which the ITEM is to be inserted in the LSP fragment;
    when a length of a residual space in the LSP fragment is determined to be greater than or equal to a length of the ITEM to be inserted, directly inserting the ITEM to be inserted into the LSP fragment according to the serial number of the LSP fragment and the information of the position in which the ITEM is to be inserted; and reorganising and updating the link state information in the LSP fragment.

3. The method as claimed in claim 2, after setting, according to the length of the reserved space, the reserved space in all the LSP fragments which are generated in sequence, further comprising:

when the length of the residual space in the LSP fragment is determined to be smaller than the length of the ITEM to be inserted, and at least one LSP fragment which is not used exists in a currently used Intermediate System (IS), reorganising and updating the link state information in each LSP fragment in sequence, starting from the LSP fragment corresponding to the serial number.

4. An apparatus for generating a Link State Protocol data packet (LSP), comprising:

a configuration component, configured to configure a length of a reserved space, wherein the length of the reserved space is smaller than a default maximum length of a single LSP fragment; and a setting component, configured to set, according to the length of the reserved space, the reserved space in all LSP fragments which are generated in sequence;

wherein a space out of the reserved space in each LSP fragment of the all LSP fragments is filled with link state information;

wherein the apparatus further comprising: a first adjustment component, configured to readjust the length of the reserved space when the length of the residual space in the LSP fragment is determined to be smaller than the length of the ITEM to be inserted, and all LSP fragments in the currently used IS are already used;

or wherein the apparatus further comprising: a second searching component, configured to search for an LSP fragment where an ITEM to be deleted is located; a judgment component, configured to judge whether at least one other ITEM, except the ITEM to be deleted, exists in the LSP fragment a third reorganisation and update component, configured to reorganise and update the link state information in the LSP fragment when the judgment component judges that the at least one other ITEM, except the ITEM to be deleted, exists in the LSP fragment and a second adjustment component, configured to readjust the length of the reserved space when the judgment component judges that no other ITEM, except the ITEM to be deleted, exists in the LSP fragment;

wherein the length of the reserved space is readjusted according to a following formula:

$$L_r = \left(\sum_{n=0}^{256}(L_{max} - L_n^{cur})/256\right) * N\ \%,$$

where $L_r$ is the length of the reserved space, $L_{max}$ is the default maximum length, $L_n^{cur}$ represents a current actual length of an LSP fragment numbered as n, $0 \leq n \leq 256$, $0 < N < 100$.

5. The apparatus as claimed in claim 4, further comprising:

a first searching component, configured to search, according to a type of a link state information item (ITEM) to be inserted and/or a key word of the ITEM to be inserted, for a serial number of an LSP fragment corresponding to the ITEM to be inserted, and information of a position in which the ITEM is to be inserted in the LSP fragment;

an insertion component, configured to, when a length of a residual space in the LSP fragment is determined to be greater than or equal to a length of the ITEM to be inserted, directly insert the ITEM to be inserted into the LSP fragment according to the serial number of the LSP fragment and the information of the position in which the ITEM is to be inserted; and a first reorganisation and update component, configured to reorganise and update the link state information in the LSP fragment.

6. The apparatus as claimed in claim 5, further comprising:

a second reorganisation and update component, configured to, when the length of the residual space in the LSP fragment is determined to be smaller than the ITEM to be inserted, and at least one LSP fragment which is not used exists in a currently used Intermediate System (IS), reorganise and update the link state information in each LSP fragment in sequence, starting from the LSP fragment corresponding to the serial number.

* * * * *